Patented Aug. 12, 1952

2,606,924

UNITED STATES PATENT OFFICE 2,606,924

BIS(4-AMINOCYCLOHEXYL)-METHANE

Gerald M. Whitman, New Castle, Del., assignor to E. I. du Pont de Nemours & Company, Wilmington, Del., a corporation of Delaware No Drawing. Application June 9, 1949,
Serial No. 98,174

1 Claim. (Cl. 260—563)

This invention relates to new chemical compounds and more particularly to dialicyclicdiamines and to their preparation.

This application is a continuation-in-part of application Ser. No. 615,912, now abandoned, filed jointly by me with W. Kirk, R. S. Schreiber, and G. M. Whitman on September 12, 1945.

This invention has as an object a new type of dialicyclic diamine. A further object is a diamine of this kind which is particularly valuable for the preparation of polyamides. A further object resides in a method for obtaining these diamines. Other objects will appear hereinafter.

The diamines of this invention consist of a mixture of stereoisomeric bis(4-aminocyclohexyl)methanes, which mixture is liquid at normal temperatures. This mixture of bis(4-aminocyclohexyl)methanes is obtained in the manner more particularly described hereinafter by reacting bis(4-aminophenyl)methane with hydrogen in contact with a ruthenium catalyst.

The normally liquid mixture of new stereoisomeric bis(4-aminocyclohexyl)methanes described herein is unique in being a mixture of stereoisomers which are normally solid melting at about 36° C., 61° C., and 65° C., respectively. This liquid mixture of normally solid isomeric bis(4-aminocyclohexyl)methanes when reacted by fusion technique with a typical dicarboxylic acid, namely, adipic acid, used in the production of polyamides, yields a polyamide of most unexpected and outstanding properties with respect to clarity, transparency, toughness and stability at temperatures far above its fusion point of 235° C. and in being easily spun into long filaments which can be cold drawn into oriented fibers. On the other hand, the isomeric mixture of perhydrobenzidines, which is obtained by hydrogenation of benzidine, is a solid melting at 58° C. and when reacted with adipic acid by the same method yields an opaque, brittle, friable solid of poor stability. When heated, this product does not melt but instead decomposes.

The mixture of stereoisomeric bis(4-aminocyclohexyl)methanes, which is the subject matter of this invention, is liquid at normal temperatures, being materially different in this respect from the closely related hydrogenation product from bis(4-aminophenyl)ethane which is semisolid at normal temperatures. The mixture of isomeric bis(4-aminocyclohexyl)ethanes, which can be obtained by the method described herein for obtaining the isomeric bis(4-aminocyclohexyl)methanes, yields a polyamide with adipic acid, by fusion, technique which is lemon colored, brittle, and which does not melt below 360° C., in contrast to the brilliantly clear, transparent, tough, spinnable polyamide obtained under similar conditions from the normally liquid mixture of bis(4-aminocyclohexyl)methanes and adipic acid.

The normally liquid bis(4-aminocyclohexyl)methanes of this invention are prepared by heating bis(4-aminophenyl)methane with hydrogen in contact with a ruthenium catalyst at a temperature within the range of from 75–125° C. under a pressure within the range of from 100 lbs./sq. in. to 15,000 lbs./sq. in., and continuing the reaction until both of the aryl nuclei of the bis(aminophenyl)methane have been completely hydrogenated. Ruthenium catalyst is uniquely selective in the production of this stereoisomeric mixture of bis(4-aminocyclohexyl)methanes. The invention can be carried out with various arrangements and selections of equipment. In the preferred arrangement, however, a pressure reactor is charged with the compound to be reduced, a volatile organic solvent and the ruthenium catalyst. The reactor is closed, pressured with hydrogen and the reaction mixture heated with agitation. After an amount of hydrogen corresponding to that theoretically required to effect the desired reduction has been absorbed, agitation is stopped, the reactor is cooled, opened, and the contents discharged. The reaction mixture is filtered to remove the catalyst, and the reaction product is isolated from the filtrate by conventional means.

The invention is further illustrated by the the following examples in which proportions are in parts by weight, unless otherwise specified.

Example I

A mixture of 49.5 parts of bis(para-aminophenyl)methane, 129 parts of dioxane, and 2.5 parts of finely divided ruthenium oxide catalyst is shaken under 131 atms. pressure of hydrogen at 100° C. until hydrogen absorption has ceased. Distillation of the filtered product gives bis(4-aminocyclohexyl)methane. This product boils at 141° to 143° C. at 4 mm., has an $$N_D^{32.5°\ C.} = 1.5030$$

and a neutral equivalent of 105.0. The yield is 79.2% of the theoretical. The neutral equivalent calculated for $C_{13}H_{26}N_2$ is 105.2.

Example II

A mixture of 1250 parts of bis(4-aminophenyl)-methane, 3234 parts of dioxane and 25 parts of finely divided ruthenium oxide catalyst is placed in an autoclave and subjected, with stirring, to a hydrogen pressure of 1500–2700 lbs./sq. in. at a temperature of 105–120° C. These conditions are maintained for 4.5 hours, even though hydrogen absorption ceases at the end of four hours. At the end of this period the autoclave is opened, the contents discharged, and the reaction product filtered to remove the catalyst. From the filtrate there is isolated, by distillation, 1147.8 parts of bis(4-aminocyclohexyl)methane as a clear, colorless, viscous liquid. The yield of bis(4-aminocyclohexyl)methane corresponds to 86.7%. The material obtained has a boiling point of 121° C. at 0.5 mm. and 123° C. at 0.75 mm. The neutral equivalent is 105.25 and the $N_D^{29.5° C.}=1.5042$.

When the bis(4-aminocyclohexyl)methane obtained as described above is maintained at 6° C. for a period of time, it is converted to a crystalline solid which partially melts when warmed to room temperature (about 24° C.).

The normally liquid bis(4-aminocyclohexyl)-methane prepared as described above is unique in giving with adipic acid a clear, transparent, tough polyamide. The preparation of this polyamide is described below:

A salt of the normally liquid bis(4-aminocyclohexyl)methane and adipic acid is prepared by dissolving 10.5 parts of the bis(4-aminocyclohexyl)methane in 50 parts of absolute ethanol, dissolving 7.3 parts of adipic acid in 50 parts of absolute ethanol and mixing the solutions. The resulting insoluble salt precipitates as the solution is cooled. The salt is filtered and dried in vacuum at room temperature. This salt is charged into a reaction vessel, purged with nitrogen and heated at 310° C. and atmospheric pressure under nitrogen for 3.25 hours. The resulting polyamide is clear, transparent, tough and easily spinnable into long fibers which can be cold drawn.

In the preparation of the normally liquid bis(4-aminocyclohexyl)methanes of this invention, there can be used ruthenium in any form which is catalytically active. Thus there can be used elementary ruthenium or such ruthenium compounds as the oxides, e. g., ruthenium sesquioxide, dioxide and tetroxide; perruthenites, e. g., barium perruthenite; ruthenates, e. g., potassium, sodium, barium, strontium, calcium, magnesium and silver ruthenates; perruthenates, e. g., potassium and sodium perruthenates; ruthenium halides, e. g., ruthenium pentafluoride and ruthenium dichloride, trichloride and tetrachloride; ruthenium chloro salts, e. g., potassium chloro perruthenates; ruthenium sulfides, e. g., ruthenium disulfide and trisulfide, ruthenium sulfate, ruthenium nitrosonitrate, and the like.

Optimum results are obtained when the ruthenium catalyst is present in finely divided form. When it is desired to use low catalyst concentrations, it is advisable to employ the ruthenium supported on a carrier such as charcoal, silica gel, kieselguhr, zeolite, alumina, and the like. Such supported catalysts may be prepared as described in U. S. Patent 2,079,404, or by other methods involving reduction of a compound of ruthenium in the presence of a carrier substance, as described below:

Ten parts of finely divided ruthenium oxide is fused in a nickel crucible with about 30 parts of sodium peroxide. The melt is dissolved in 200 parts of distilled water and the resulting solution is poured with stirring over 100 parts of activated powdered charcoal. The impregnated charcoal is dried overnight at 105° C. and powdered to a fine black dust. Analysis shows the product to contain about 7% of ruthenium oxide.

The amount of ruthenium catalyst used may vary within the range of from 0.001% to 5% by weight of the bis(4-aminophenyl)methane being reduced. The exact percentage is dependent upon whether the reaction is to be effected at a low temperature or whether catalyst economy is the principal consideration. For low temperature operation, that is, at temperatures within the range of from 20 to about 125° C., it is desirable to use an amount of catalyst within the range of from 1% to 5% by weight of the bis(4-aminophenyl)methane being reduced. However, at higher temperature substantial reduction of the bis(4-aminophenyl)methane is had most economically when as little as 0.001% catalyst is used. As the amount of catalyst decreases, the temperature required to attain a practical rate of reaction increases. Maximum rates are obtained most economically at temperatures of at least 75° C. through the employment of an amount of catalyst within the range of from 0.001% to 1% by weight of the bis(4-aminophenyl)methane.

The normally liquid bis(4-aminocyclohexyl)-methane of this invention is a mixture of three solid stereoisomers which melt at about 36° C., 61° C., and 65° C., respectively. The ratio of these stereoisomers present in any given sample of liquid bis(4-aminocyclohexyl)methane can be controlled to a large extent by proper choice of reaction conditions during preparation. The production of a product containing a preponderance of low melting isomers is favored by use of low temperatures, e. g., 100–125° C. and high catalyst concentration, e. g., 2–5% of ruthenium by weight.

The catalytic hydrogenation of the bis(4-aminophenyl)methane may be effected either as a batch, semicontinuous or continuous operation in the presence or absence of a solvent or diluent. Since substantially improved reduction is obtained when the bis(4-aminophenyl)methane is in a fluid condition, that is, is either a liquid or is dissolved in a liquid solvent, the reaction is generally carried out under such conditions. The use of a solvent is particularly advantageous because it not only provides conditions which are favorable for the hydrogenation but also aids in the dissipation of the heat of reaction and thus materially assists in obtaining better temperature control of the reaction. Suitable solvents are alcohols such as methanol, ethanol, propanol, and the like, ethers such as dioxane and hydrocarbons such as cyclohexane, and the like.

As has been previously indicated, the normally liquid stereoisomeric bis(4-aminocyclohexyl)-methane described herein is particularly valuable for the production of polyamides. The example which follows illustrates the preparation of a polyamide from the normally liquid bis(4-aminocyclohexyl)methane of Example II and sebacic acid:

A salt from the bis(4-aminocyclohexyl)methane of Example II and sebacic acid is prepared by dissolving 21 parts of the diamine in 100 parts of absolute ethanol and 20.2 parts of sebacic acid in 100 parts of absolute ethanol and mixing the two solutions. The salt is charged into a reaction vessel and heated at 255° C. at atmospheric pressure under nitrogen for 0.5 hour, then at 285° C. at atmospheric pressure for 0.5 hour. The reaction is completed by heating at 285° C. under approximately 2 mm. pressure for 1.75 hours. The resulting polyamide is colorless, clear, and transparent. It is very tough, has an intrinsic viscosity of 1.4 in meta-cresol, softens at 200° C., and is soluble in a mixture of chloroform and methanol.

The new liquid stereoisomeric mixture of bis-(4-aminocyclohexyl)methanes of this invention is also highly useful in the preparation of dye intermediates, germicides, surface active agents, pharmaceuticals, corrosion inhibitors, rubber chemicals, etc.

As many apparently widely different embodiments of this invention may be made without departing from the spirit and scope thereof, it is to be understood that this invention is not limited to the specific embodiments thereof except as defined in the appended claim.

I claim:

A mixture of isomeric bis(4-aminocyclohexyl)-methanes which is a liquid at normal temperatures.

GERALD M. WHITMAN.

REFERENCES CITED

The following references are of record in the file of this patent:

UNITED STATES PATENTS

| Number | Name | Date |
| --- | --- | --- |
| 2,494,563 | Kirk et al. | Jan. 17, 1950 |

FOREIGN PATENTS

| Number | Country | Date |
| --- | --- | --- |
| 67,203 | Norway | Dec. 20, 1943 |
| 56,448 | Netherlands | June 15, 1944 |

OTHER REFERENCES

Sibley: Trans. Inst. Rubber Ind., vol. 13, p. 465.